(12) United States Patent
Bajpai (10) Patent No.: US 8,131,890 B1
(45) Date of Patent: Mar. 6, 2012

(54) CIRCUIT AND METHOD FOR INCREASING UNIVERSAL SERIAL BUS (USB) DEVICE ENDPOINTS

(75) Inventor: Pradeep Kumar Bajpai, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 288 days.

(21) Appl. No.: 12/054,315

(22) Filed: Mar. 24, 2008

Related U.S. Application Data

(60) Provisional application No. 60/896,804, filed on Mar. 23, 2007.

(51) Int. Cl.
  G06F 13/00 (2006.01)
  G06F 3/00 (2006.01)
(52) U.S. Cl. .............. 710/31; 710/30; 710/52; 709/236; 711/118
(58) Field of Classification Search .................. None
  See application file for complete search history.

(56) References Cited

U.S. PATENT DOCUMENTS

| 6,148,354 | A  | * | 11/2000 | Ban et al. ................... 710/301 |
| 6,205,501 | B1 | * | 3/2001 | Brief et al. ................... 710/100 |
| 6,434,643 | B1 | * | 8/2002 | Ejiri ................................. 710/58 |
| 6,745,264 | B1 | * | 6/2004 | Luke et al. ...................... 710/52 |
| 6,928,505 | B1 | * | 8/2005 | Klingman ....................... 710/305 |
| 7,222,201 | B2 | * | 5/2007 | Augustin et al. ............... 710/105 |
| 7,290,072 | B2 | * | 10/2007 | Quraishi et al. ............... 710/105 |
| 7,895,387 | B1 | * | 2/2011 | Khodabandehlou et al. . 710/316 |
| 2003/0186715 | A1 | * | 10/2003 | McGowan ...................... 455/509 |
| 2004/0093454 | A1 | * | 5/2004 | Teng ............................... 710/310 |
| 2005/0091564 | A1 | * | 4/2005 | Oshita et al. ................... 714/748 |
| 2007/0168583 | A1 | * | 7/2007 | Kim ................................. 710/56 |
| 2008/0162753 | A1 | * | 7/2008 | Liu et al. .......................... 710/74 |

* cited by examiner

*Primary Examiner* — Henry Tsai
*Assistant Examiner* — Michael Sun (57) ABSTRACT

A USB control circuit for increasing USB endpoints includes a token detection circuit. The USB control circuit is configured to receive a first logical endpoint (LEP) address and a USB token. The token detection circuit is configured to determine a direction of a USB data transfer in accordance with a USB token type. The USB control circuit includes an endpoint configuration and status control logic circuit in communication with the token detection circuit. The endpoint configuration and status control logic circuit is configured to control configuration and status information associated with each of a plurality of LEP input buffers and LEP output buffers. The USB control circuit is configured to generate a second LEP address in accordance with a combination of the first LEP address and the determined direction to increase a quantity of LEPs without increasing a quantity of physical endpoint buffers of a USB device.

18 Claims, 11 Drawing Sheets

401 — Receiving a logical endpoint number of n-bits and a universal serial bus (USB) token by a token detection circuit and a status and configuration logic circuit from a universal serial bus (USB) host.

402 — Generating a new logical endpoint address of (n+1)-bits by combining the logical endpoint number and its detected direction by the token detection circuit and the status and configuration logic circuit.

403 — Status control logic uses new logical endpoint address to control/update status of LEPnIN and LEPnOUT where n = (0,15).

404 — Providing the new logical endpoint address to a logical endpoint (LEP) to physical endpoint (PEP) mapping circuit by the token detection circuit and the status and configuration logic circuit.

405 — Determining which logical endpoint data fits in to which of the plurality of physical endpoint buffers by the logical endpoint (LEP) to physical endpoint (PEP) mapping circuit.

406 — Storing the logical endpoint number (LEP#) obtained from the logical endpoint (LEP) to physical endpoint (PEP) mapping circuit in a first in first out (FIFO) corresponding to the plurality of physical endpoint buffers.

407 — Providing a control information to a controller circuit, when multiple logical endpoints are mapped to a single physical endpoint buffer.

408 — Sending the logical endpoint address from the top of the queue in the first in first out (FIFO) to an endpoint service logic circuit by the controller circuit.

409 — Outputting of the data from the endpoint service logic circuit to an external processor in a first in first out (FIFO) manner.

410 — Achieving an increase in the number of USB device endpoints from $2^n$ to $2^{n+1}$ and the number of physical endpoint buffers is maintained constant.

FIG. 9

CIRCUIT AND METHOD FOR INCREASING UNIVERSAL SERIAL BUS (USB) DEVICE ENDPOINTS This application claims priority under 35 U.S.C. §119(e) to U.S. Provisional Application No. 60/896,804, filed on Mar. 23, 2007, the entire contents of which are hereby incorporated by reference herein.

BACKGROUND

1. Field of the Invention

The present invention relates to Universal Serial Bus (USB) systems. More particularly, the present invention relates to a circuit and method for increasing USB device endpoints.

2. Background Information

A conventional Universal Serial Bus (USB) is a communication channel between a host computer and a number of peripheral devices. The USB replaces a wide range of slow and different buses, such as parallel, serial and keyboard connections, with a single bus type to which all devices can connect. The USB can support almost any type of device that can be connected to a personal computer (PC), such as a printer, scanner, digital music players, digital cameras, mobile phones and the like. A conventional USB transaction involves the transmission of packets (for example, three packets) between a USB host and USB device: a token packet, a data packet, and a status packet. A USB transaction begins when the USB host sends a USB token packet describing the type and direction of the transaction (i.e., whether data is transmitted to the USB device from the USB host or to the USB host from the USB device), a USB device address, and an endpoint number. Each USB device has one or more endpoints designated by respective endpoint numbers. An endpoint is the ultimate source or destination for data of the data transaction.

The USB device that is addressed by the token packet selects itself by decoding the appropriate address fields of the token packet. After the token packet is transmitted, data is then transferred in the data packet either from the USB host to a USB device or from a USB device to the USB host. The direction of data transfer is specified in the token packet. The destination of the transaction then sends the status packet indicating whether data transfer was successful or not. The USB device endpoints indicate the number of USB device applications a USB system can support. The memory in a USB device refers to the number of physical endpoints. Thus, the greater the number of physical endpoint buffers in a memory, the greater the cost of the memory. Therefore, the USB devices becomes more expensive if support for greater numbers of USB device applications is desired, which is a disadvantage of the conventional USB system.

Figure 1:
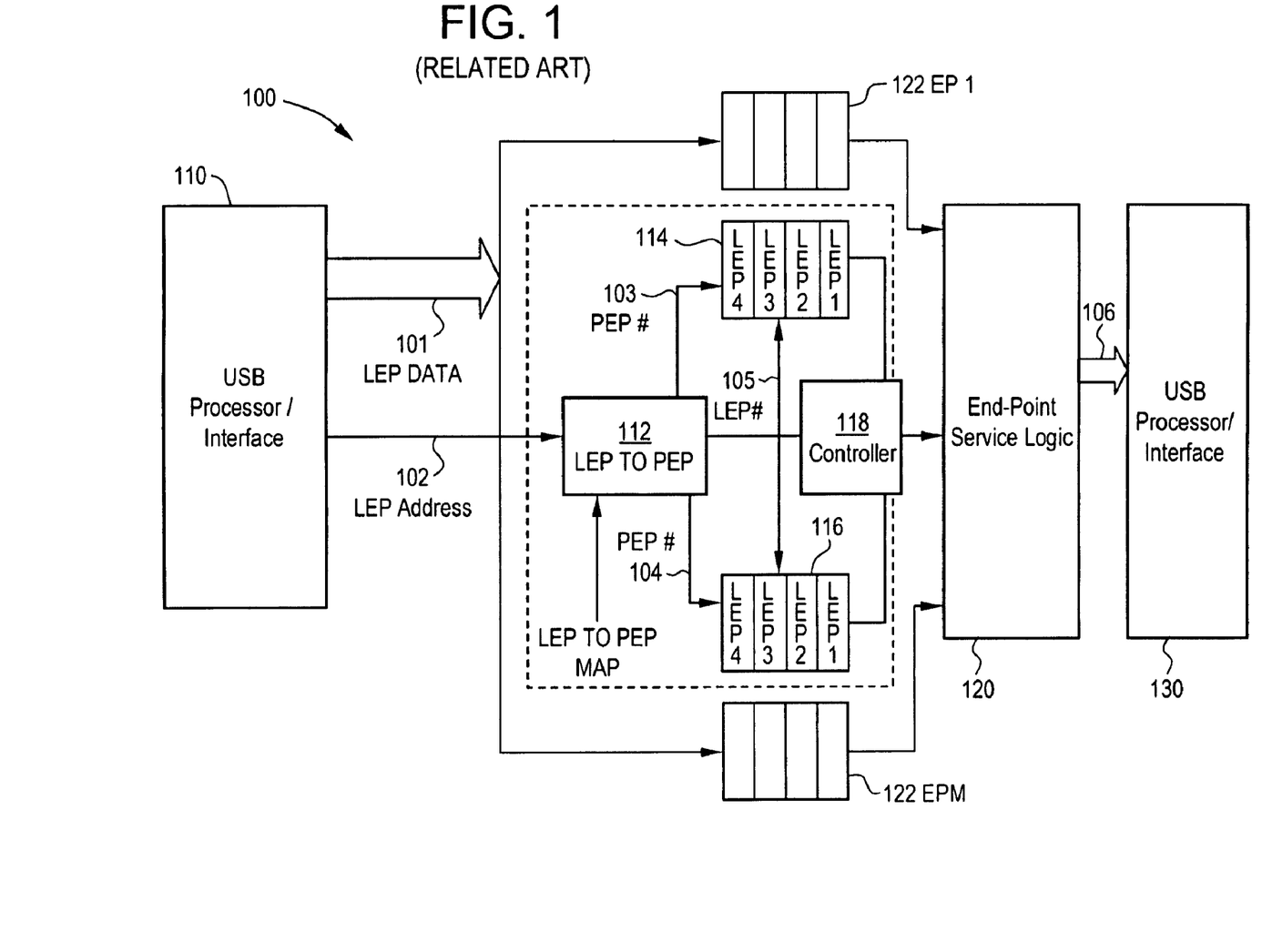
FIG. 1 illustrates a circuit diagram illustrating a conventional system for implementing a Universal Serial Bus (USB) endpoint.

FIG. 1 illustrates a conventional system 100 for implementing USB endpoints. The conventional system 100 comprises a USB host 110 coupled to a plurality of physical endpoint buffers, including EP1 122 to EPM 124, in which the logical endpoint (LEP) data 101 is provided to the physical endpoint (PEP) buffers EP1 122 and the EPM 124. The USB host 110 is further coupled to a LEP-to-PEP mapping circuit 112, in which a LEP address 102 is provided to the LEP-to-PEP mapping circuit 112. The LEP-to-PEP mapping circuit 112 is further coupled to a plurality of LEP buffers 114 and 116, in which the LEP data is stored in a first in first out (FIFO) manner. The LEP buffers 114 and 116 are coupled to a controller circuit 118, in which control information is passed to the controller circuit 118 when multiple LEPs are mapped to a single physical endpoint. The controller circuit 118 is coupled to endpoint service logic 120, in which the controller circuit 118 sends the LEP address on the top of the queue to the endpoint service logic 120. The output from the plurality of the PEP buffers EP1 122 to EPM 124 are further coupled to the endpoint service logic 120. The endpoint service logic 120 is further coupled to a USB processor 130.

A disadvantage of the conventional system 100 is that it comprises an endpoint number field of only 4-bits, and, therefore, can only support a maximum of 16 USB device endpoints. In the conventional system 100, each LEP buffer is used for data flow in one direction only, that is, data flow from USB host to external processor or external processor to USB host. Another disadvantage of the conventional system 100 is that increasing the number of endpoints increases the number of PEP buffers, thereby increasing the physical memory and increasing the cost of manufacture.

It would be desirable to provide an improved USB system to increase the number of USB device endpoints without requiring additional physical memory. It would be also desirable to provide an improved USB system to support greater numbers of USB device applications.

SUMMARY OF THE INVENTION

A circuit and method for increasing universal serial bus (USB) device endpoints are disclosed. In accordance with exemplary embodiments of the present invention, according to a first aspect of the present invention, a USB control circuit includes a token detection circuit, wherein the USB control circuit is configured to receive a first logical endpoint (LEP) address and a USB token, and wherein the token detection circuit is configured to determine a direction of a USB data transfer in accordance with a USB token type. The circuit includes an endpoint configuration and status control logic circuit in communication with the token detection circuit, wherein the endpoint configuration and status control logic circuit is configured to control configuration and status information associated with each of a plurality of LEP input buffers and LEP output buffers, and wherein the USB control circuit is configured to generate a second LEP address in accordance with a combination of the first LEP address and the determined direction to increase a quantity of LEPs without increasing a quantity of physical endpoint (PEP) buffers of a USB device.

According to the first aspect, the USB control circuit includes a LEP-to-PEP mapping circuit in communication with the USB control circuit, wherein the LEP-to-PEP mapping circuit is configured to determine to which PEP buffer to send LEP data. The endpoint configuration and status control logic circuit is configured to provide the second LEP address to the LEP-to-PEP mapping circuit. The LEP-to-PEP mapping circuit is in communication with a controller circuit, the plurality of LEP input buffers and LEP output buffers, and a plurality of PEP buffers. An endpoint service logic circuit in communication with the controller circuit and the plurality of PEP buffers. The controller is configured to communicate the second LEP address from a queue in a first-in-first-out (FIFO) manner to the endpoint service logic circuit, wherein the endpoint service logic circuit is further configured to receive input signals from the plurality of PEP buffers, and wherein the endpoint service logic circuit is configured to communicate endpoint data in the FIFO manner to an external processor.

In accordance with the first aspect of the invention, the USB token comprises a sync field, a packet identifier, a device address field, an endpoint field, a cyclic redundancy check and an end of packet. The endpoint configuration and status control logic circuit comprises a plurality of configuration registers, and wherein the plurality of configuration registers are configured to control the configuration and status information associated with each of the plurality of LEP input buffers and LEP output buffers. The status information comprises at least one of data toggle status and LEP stall status. The endpoint configuration and status control logic circuit is configured to determine a USB device handshake response for USB tokens of a LEP, and wherein a handshake packet is configured to indicate whether at least one of LEP data and the USB token were received successfully. The USB control circuit is compliant with a USB 2.0 specification.

According to a second aspect of the present invention, a system for increasing Universal Serial Bus (USB) device endpoints includes a host device in communication with digital control logic, wherein the digital control logic is configured to support a plurality of device applications without increasing physical memory of the host device, and wherein the digital control logic is configured to generate a logical endpoint (LEP) address by combining a LEP number and a direction indication associated with a host device token. The host device comprises a USB host device.

According to a third aspect of the present invention, a method of increasing Universal Serial Bus (USB) device endpoints in a USB system, includes receiving a logical endpoint (LEP) number and a USB token; and determining direction of data transfer in accordance with a USB token type; and generating a LEP address by combining the LEP number and determined direction.

According to the third aspect, the method includes mapping the LEP address to a physical endpoint (PEP); and communicating LEP data to one of a plurality of PEP buffers in accordance with the mapping. The method also includes storing the LEP address in a first in first out (FIFO) queue corresponding to the plurality of PEP buffers. In accordance with another example of the invention, the method includes communicating the LEP address from a top of the FIFO queue when an acknowledgement is received from a USB host for OUT tokens or from a USB processor for IN tokens. According to another example of the invention, the step of communicating the LEP address includes outputting the LEP data to the USB processor in a FIFO manner.

According to a fourth aspect of the present invention, a method for determining a unique Universal Serial Bus (USB) endpoint in a USB system is disclosed, which includes a first step of determining a direction of LEP data flow, a second step of generating a logical endpoint (LEP) address by combining a logical endpoint number and the determined direction. A third step is mapping the LEP address to a physical endpoint (PEP). A fourth step is storing the LEP address in a FIFO queue corresponding to PEP buffers, wherein the LEP address stored at a top of the FIFO queue is popped when an acknowledgment is received from a USB host for incoming tokens or from a USB processor for outgoing tokens.

According to the fourth aspect, wherein for an outgoing token, LEP data is pushed into an OUT PEP buffer in accordance with space availability, and wherein for an incoming token, LEP data is popped from an IN PEP buffer in accordance with data availability.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to an improved circuit and method for Universal Serial Bus (USB) systems for increasing the number of USB device endpoints. The circuit and method used in the present invention doubles the number of end-points in a target USB device without increasing the physical memory of the USB system. However, the present invention is not restricted to USB systems and can be used in standard interfaces for coupling electrical, electronic and computer circuits. In an embodiment of the invention, a USB control circuit includes a token detection circuit. The USB control circuit is configured to receive a first logical endpoint (LEP) address and a USB token. The token detection circuit is configured to determine the direction of the USB data transfer in accordance with the USB token type. An endpoint configuration and status control logic circuit is in communication with the token detection circuit. The endpoint configuration and status control logic circuit is configured to control configuration and status information associated with each of a plurality of LEP input buffers and LEP output buffers. The USB control circuit is configured to generate a second LEP address in accordance with a combination of the first LEP address and the determined direction to increase the quantity of LEPs without increasing a quantity of physical endpoint (PEP) buffers of a USB device. In other words, the improved circuit includes a configuration to increase the endpoint number field from n-bits to (n+1)-bits, thereby increasing the number of the USB device endpoints from $2^n$ to $2^{n+1}$ while maintaining the number of PEP buffers constant. For example, a LEP address of n-bits and a USB token is received by the token detection circuit from the USB host. The token detection circuit determines the direction of data transfer based on the USB token, and generates a new LEP address of (n+1)-bits.

Figure 2:
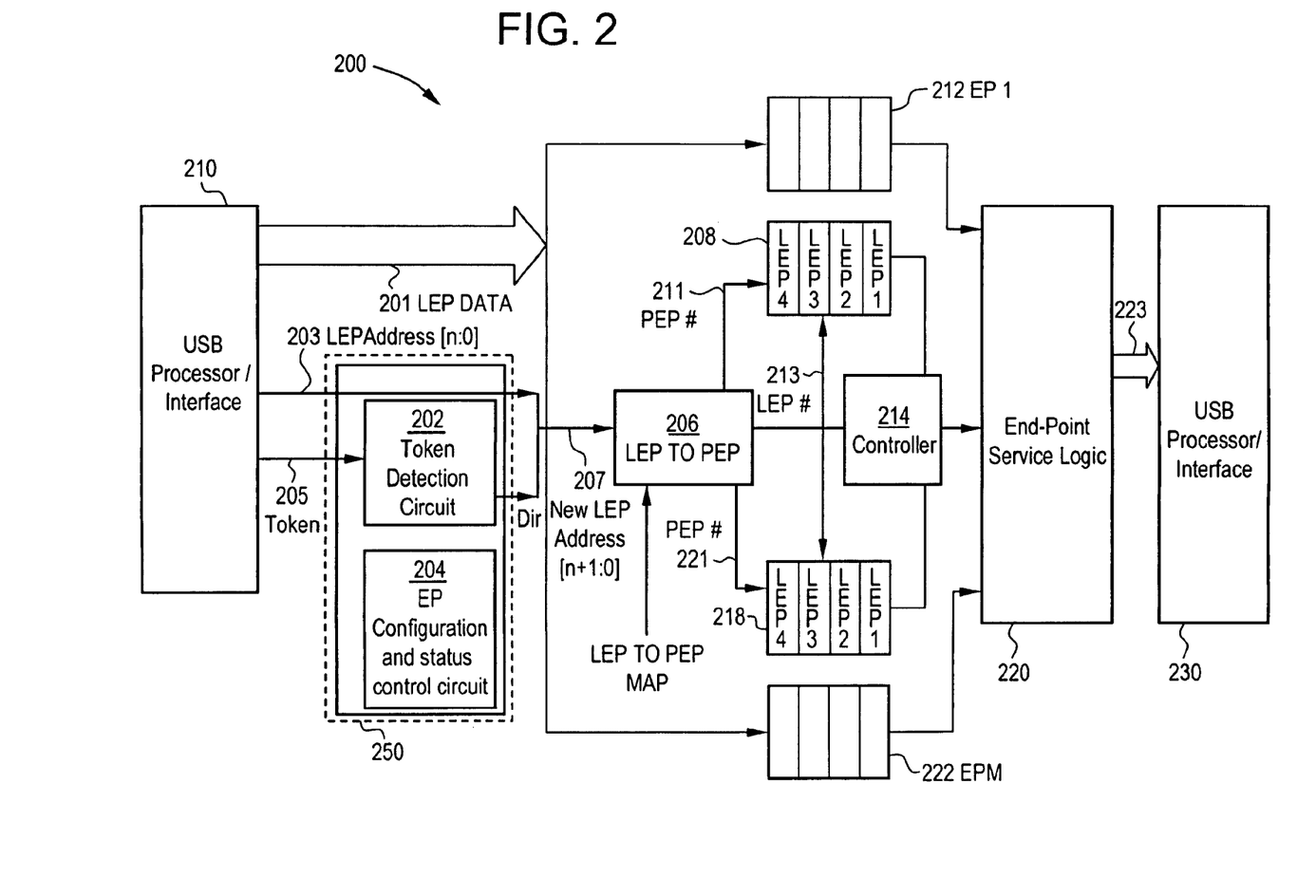
FIG. 2 illustrates an improved circuit for implementing a USB endpoint according to an embodiment of the present invention.

These and other aspects of the present invention will now be described in greater detail. FIG. 2 illustrates an improved circuit 200 for USB systems to implement the increased number of USB device endpoints. The circuit 200 comprises a USB host 210. Any suitable type of USB host 210 can be used in accordance with exemplary embodiments of the present invention (e.g., a USB host 210 that is compliant with the USB 2.0 standard, which is incorporated by reference herein in its entirety). The USB host 210 is coupled to USB control circuit 250 that includes a token detection circuit 202 and a configuration and status control logic circuit 204 (alternatively referred to as a status and configuration logic circuit). The USB host 210 is further coupled to a plurality of PEP buffers 212 and 222. The token detection circuit 202 and the configuration and status control logic circuit 204 are coupled to a LEP-to-PEP-mapping circuit 206 that is configured to determine which LEP data 201 goes to which PEP buffer 212 and 222. The LEP-to-PEP mapping circuit 206 is further coupled to a controller circuit 214 and to a plurality of LEP buffers 208 and 218. The controller circuit 214 and the plurality of PEP buffers 212 and 222 are coupled to an endpoint service logic circuit 220. The endpoint service logic circuit 220 is coupled to a USB processor 230.

The circuit 200 is configured to increase the number of USB device endpoints by increasing the endpoint number field from n-bits to (n+1)-bits (where n can be any suitable number) to increase the USB device endpoints from $2^n$ to $2^{n+1}$ (i.e., doubling the number of device endpoints), without a concomitant increase the in the number of PEP buffers 212 and 222. In the circuit 200 illustrated in FIG. 2, the token detection circuit 202 receives a LEP address 203 and a USB token 205 from the USB host 210. USB is a packet-based technology. Accordingly, the USB token 205 can comprise a packet that is communicated during the USB transaction. Such a packet can comprise, for example, a sync field, a Packet Identifier (PID) field, a device address (ADDR) field, an endpoint (ENDP) field, a cyclic redundancy check (CRC) field, an end of packet (EOP) field, and any other suitable type of field appropriate for such a USB packet. For example, the ENDP field of the USB token 205 comprises an n-bit number (or address), so that the number of conventional USB device endpoints provided is $2^n$. The token detection circuit 202 is configured to determine the direction of data transfer in accordance with the type of the USB token 205 (e.g., IN or OUT as sent by the USB host 210). According to exemplary embodiments of the present invention, the determined direction is used as the $(n+1)^{th}$ bit to generate a new LEP address 207. More particularly, the configuration and status control logic circuit 204 can be configured to generate a new LEP address 207 by combining the LEP address 203 received from the USB host 210 and the $(n+1)^{th}$ bit that is determined from the direction of the data transfer. The new LEP address 207 comprises an endpoint (ENDP) field of (n+1)-bits, thereby providing $2^{n+1}$ USB device endpoints. No increase in the memory space of the USB device is required.

The configuration and status control logic circuit 204 comprises a plurality of configuration registers. The plurality of configuration registers are adapted to configure a plurality of outgoing LEP (LEPnOUT) buffers and a plurality of incoming LEP (LEPnIN) buffers individually. The configuration registers contain information related to or otherwise associated with logical endpoints, such as, for example, endpoint type (e.g., Bulk, Interrupt, and Isochronous) and logical-to-physical endpoint mapping. The configuration and status control logic circuit 204 comprises the status and the configuration information of the plurality of LEP buffers (LEPn), such as, for example, data toggle status and STALL status, although any other suitable type of status and/or configuration information can be maintained for the plurality of LEPn. The status and/or configuration information can be maintained individually and/or separately for the LEPnOUT and the LEPnIN. The configuration and status control logic circuit 204 is further configured to determine an appropriate USB device handshake response for USB tokens 205, such as, for example, PING, OUT and IN tokens of a LEPn. A handshake packet can denote if the data or the token was received successfully or not.

Once the new LEP address 207 is generated, the configuration and status control logic circuit 204 provides the new LEP address 207 to the LEP-to-PEP mapping circuit 206. The LEP-to-PEP mapping circuit 206 determines which LEP data 201 goes to which PEP buffer 212 and 222. The logical endpoint number (LEP#) 213 generated by the LEP-to-PEP mapping circuit 206 is stored in a first in first out (FIFO) queue 208 and 218 corresponding to each of the plurality of PEP buffers 212 and 222. The FIFO queues 208 and 218 operate on the principle of a first-come, first-serve basis, i.e., what comes in first is handled first, what comes in next waits until the first is finished, and the like. The LEP-to-PEP mapping circuit 206 provides control information to the controller circuit 214 when multiple LEP are mapped to a single PEP. The endpoint service logic circuit 220 receives the new LEP address 207 from the top of one of the FIFO queues 208 and 218 in accordance with control information from the controller circuit 214. The endpoint service logic circuit 220 further receives input signals from the plurality of PEP buffers 212 and 222. The endpoint service logic circuit 220 provides endpoint data in a FIFO manner to the external processor interface 230 via the communication interface 223.

As discussed previously, an advantage of the circuit 200 is that it is capable of increasing the number of USB device endpoints from $2^n$ to $2^{n+1}$ by increasing the size of the endpoint field from n-bits to (n+1)-bits. Another advantage of the circuit 200 is that it can provide an increase in the number of USB device endpoints without any additional requirement for physical endpoint buffers, thereby not requiring any increase in the physical memory. Another advantage of the circuit 200 is that it can reduce the cost of manufacture and utilize less physical memory, while at the same time supporting many more USB device applications, such as, for example, digital cameras, printers, scanners, digital music players and the like. Another advantage of the circuit 200 is that it can provide a bidirectional use of each of the USB endpoints.

Figure 3:
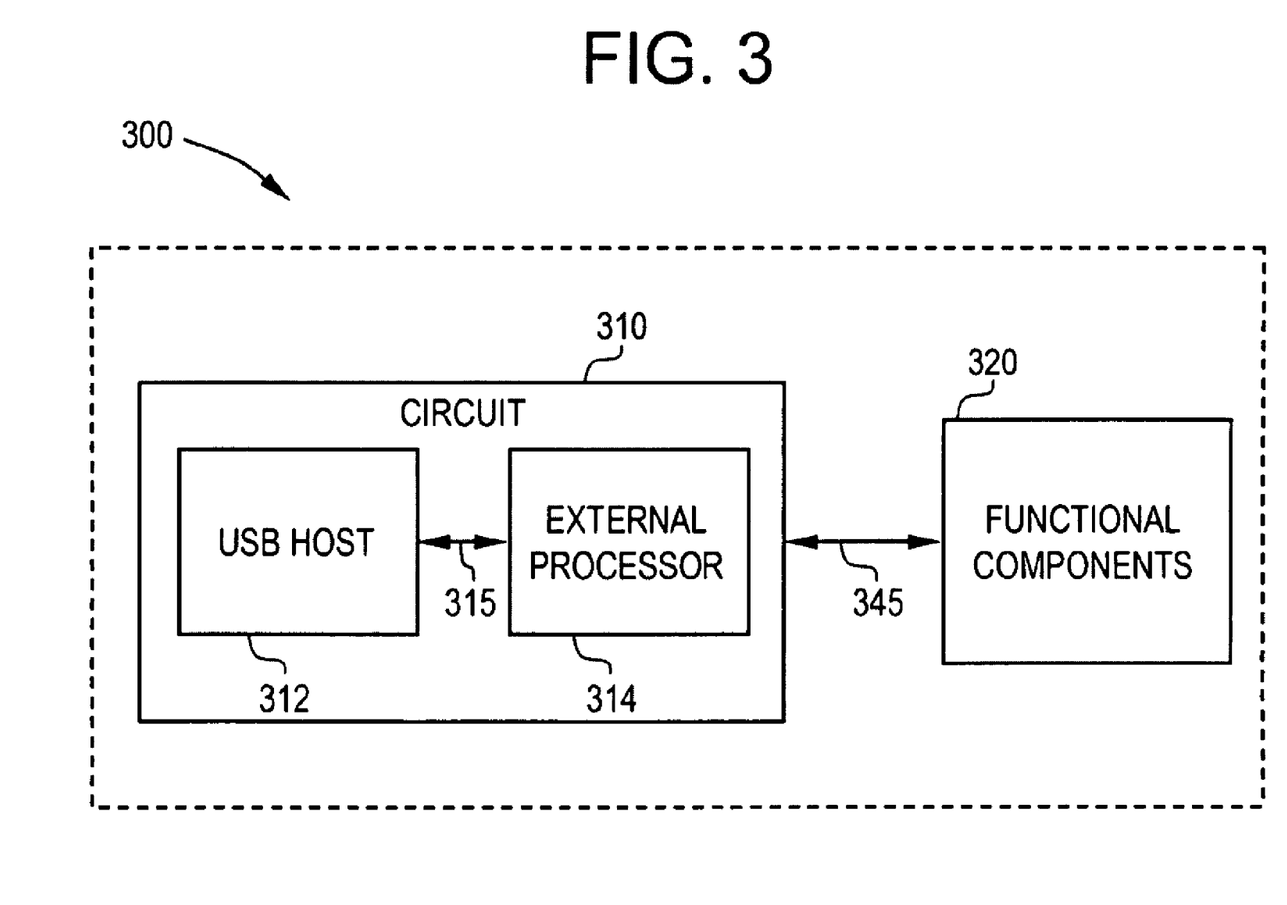
FIG. 3 illustrates a circuit diagram illustrating a system with the improved circuit according to an embodiment of the present invention.

According to an additional exemplary embodiment of the present invention, FIG. 3 illustrates a system 300 comprising a circuit 310 and a plurality of functional components 320 in communication therewith. The circuit 310 further comprises a USB host 312 coupled to any suitable type of external processor 314 via connectors 315. The circuit 310 is coupled to a plurality of functional components 320 via connectors 345. The connectors 315 and 345 can provide appropriate communication channels for communicating information between the USB host 312 and the external processor 314, and between the circuit 310 and the functional components 320, respectively. Any suitable types of functional components 320 can be used to augment the functionality supported by the circuit 310, such as USB device applications and the like. The system 300 supports numerous USB device applications simultaneously. In particular, exemplary embodiments of the present invention can support double the number of USB device applications that can be supported by conventional USB systems.

Figure 4:
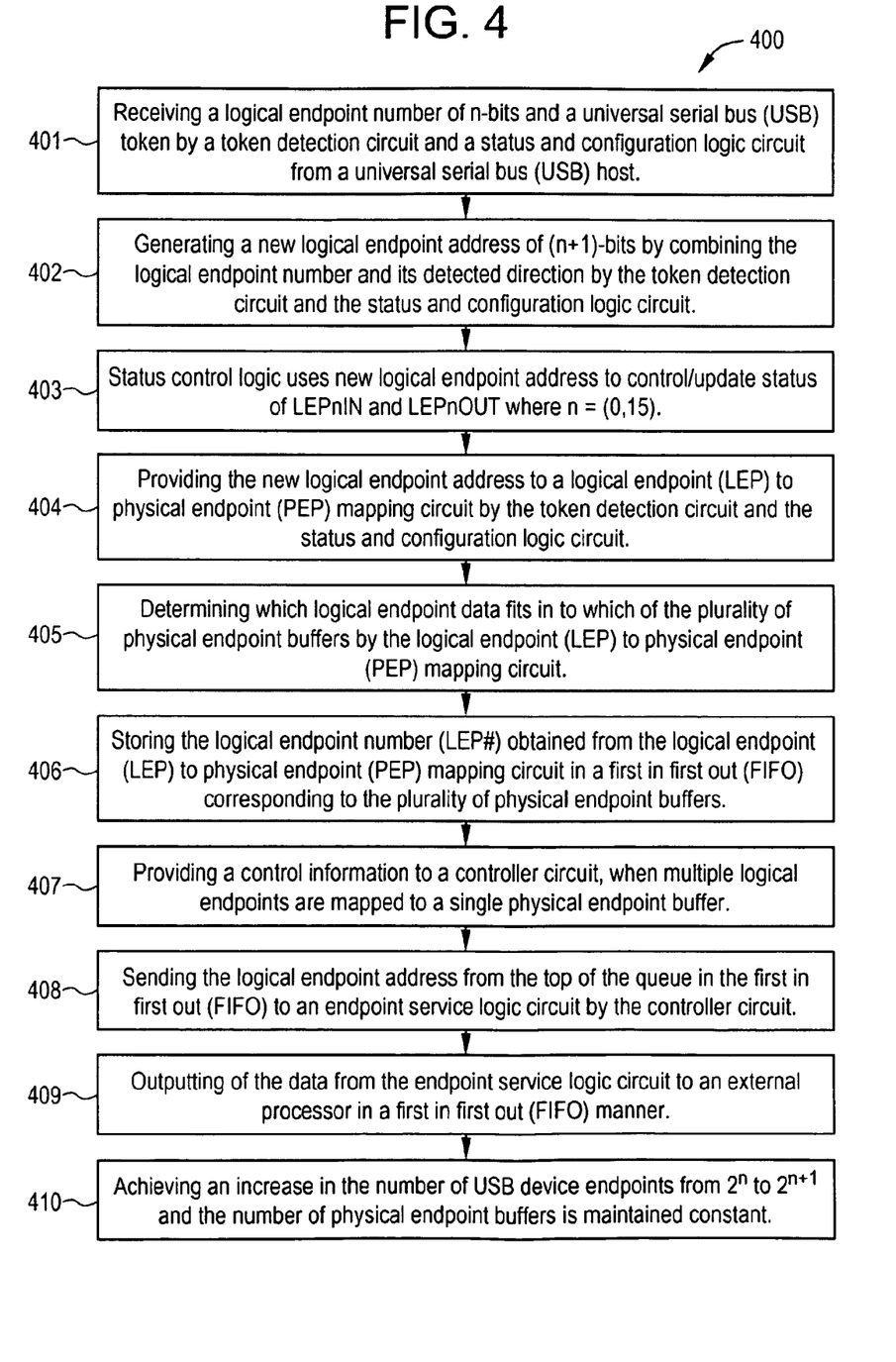
FIG. 4 illustrates a flow chart depicting a method implementing a USB endpoint according to an embodiment of the present invention.

Referring to FIG. 4, a flow chart 400 illustrates a method of increasing USB device endpoints in a USB system in accordance with an exemplary embodiment of the present invention. A first step 401 comprises receiving a LEP number or address of n-bits and a USB token (e.g., by a token detection circuit and a configuration and status control logic circuit) from a USB host. The direction of data transfer is determined (e.g., by the token detection circuit) in accordance with the USB token type. A second step 402 comprises generating a new LEP address of (n+1)-bits by combining the LEP number or address and its detected direction. A third step 403 comprises mapping the new LEP address to a PEP buffer. A fourth step 404 comprises determining which LEP data goes to which of a plurality of PEP buffers.

A fifth step 405 comprises storing the logical endpoint number (LEP#) obtained from the mapping step in a first in first out (FIFO) manner corresponding to the plurality of PEP buffers. A sixth step 406 comprises providing control information when multiple LEPs are mapped to a single PEP buffer. A seventh step 407 comprises sending the LEP address from the top of the FIFO queue when an acknowledgement is received from a USB host for OUT tokens or from a USB processor for IN tokens. An eighth step 408 comprises outputting the data to a USB processor in a FIFO manner. A ninth step 409 comprises achieving an increase in the number of USB device endpoints, wherein the size of the endpoint field is increased from n-bits to (n+1)-bits while the number of PEP buffers is maintained constant. The USB device endpoints can be increased from $2^n$ to $2^{n+1}$ with the same number of PEP buffers, thereby doubling the number of supportable USB device applications.

In an alternate exemplary embodiment of the present invention, the two FIFOs can be combined, and one FIFO can be used for the LEP address, which can be configured based on the EP direction.

Figure 5:
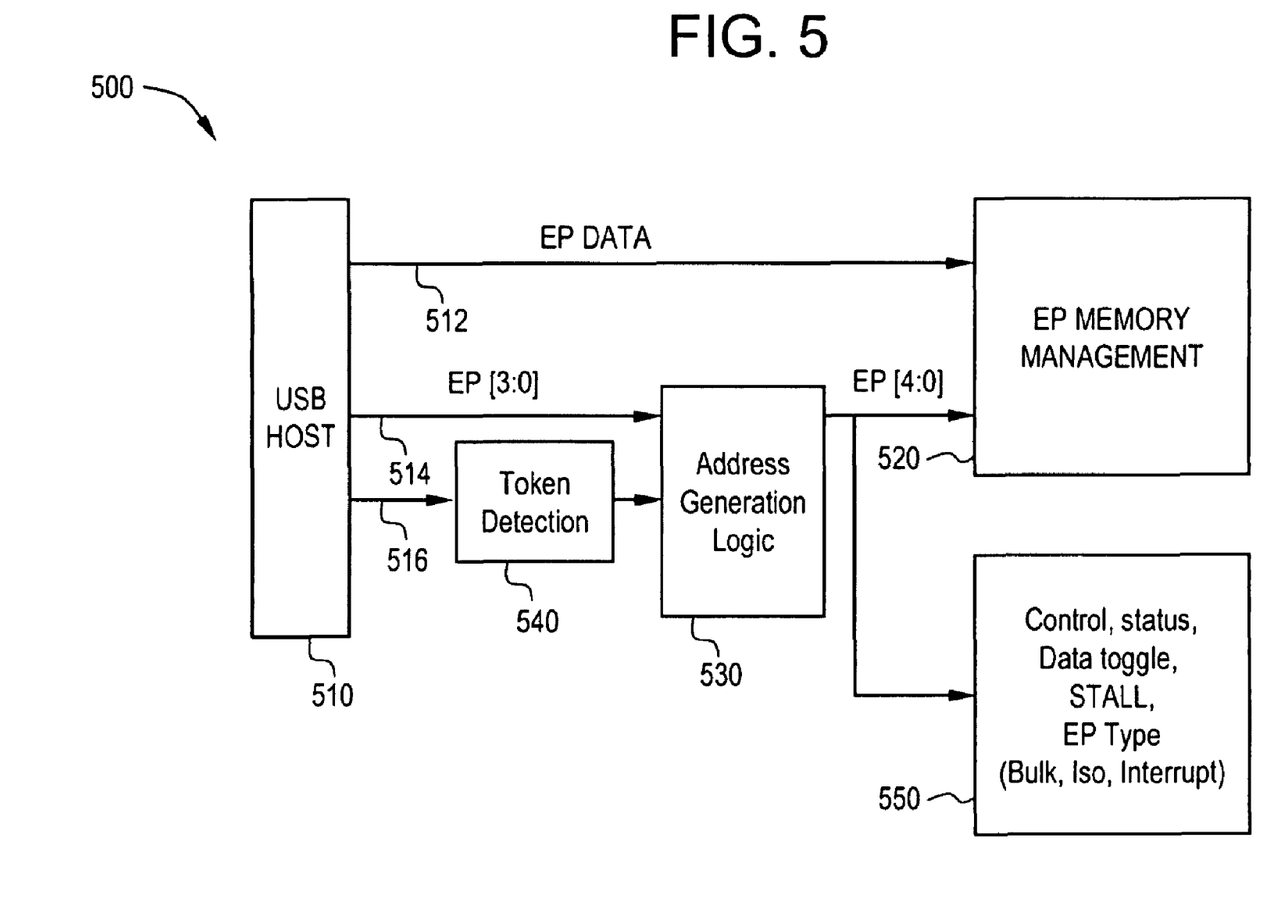
FIG. 5 illustrates a USB endpoint management system in accordance with an exemplary embodiment of the present invention.

Referring to FIG. 5, an alternate exemplary embodiment of the invention is directed to a USB endpoint management system 500, which is described in conjunction with FIG. 2. The system 500 comprises a USB host 510, which sends out endpoint (EP) data (e.g., through a first output terminal 512) to an EP memory management block 520. The EP memory management block 520 is configured to allocate storage space to the endpoint data. A second output terminal 514 of the USB host 510 is coupled to address generation logic 530. The second output terminal 514 provides a first endpoint address (e.g., a 4-bit endpoint address EP [3:0], although any suitable length address can be used) to the address generation logic 530. A third output terminal 516 of the USB host 510 is coupled to the token detection logic 540. The token detection logic 540 is configured to determine the direction of the endpoint data transfer in accordance with a data token type (IN or OUT as sent by the USB host). The address generation logic 530 generates a new LEP address by combining the LEP number and its detected direction. The new LEP address (e.g., the 5-bit address EP [4:0], although the new address can be of any suitable length) is fed to the EP memory management block 520. The output of the address generation logic 530 is further coupled to a control block 550. The control block 550 is configured to maintain and configure EP parameters, such as, for example, control, status, data toggle, stall, EP type (e.g., Bulk, Isochronous and Interrupt in accordance with USB transfer standards), and other like EP parameters. In accordance with an exemplary embodiment of the invention, the EP memory management block 520 can comprise an array of memory sub-blocks that is suitably configured in accordance with the type of the computing system with which the system 500 is being used.

Thus, according to an example exemplary embodiment of the present invention, directionality can be used as the $(n+1)^{th}$ bit to generate a new endpoint number (where n can be any suitable number). The internal (n+1)-bit endpoint number can be used to manage physical memory and USB protocol control. The internal (n+1)-bit endpoint number can also be used to generate unique USB interrupts. All of the configuration and status options of the endpoint can be addressed by using the internal (n+1)-bit endpoint number.

As discussed previously, the configuration and status control logic circuit 204 illustrated in FIG. 2 comprises a plurality of configuration registers. The plurality of configuration registers are adapted to configure the plurality of LEPnOUT buffers and the plurality of LEPnIN buffers individually. Merely for purposes of illustration and not limitation, a Central Processing Unit (CPU) of a main computing system can configure, for example, 30 configuration registers for 14IN and 14OUT endpoints. For example, at any given time, USB endpoint EP4 can be an isochronous endpoint in the OUT direction, and at the same time endpoint EP4 can be a bulk endpoint in the IN direction. Additionally, endpoint EP7 OUT can be stalled by the USB host, but EP7 IN endpoint can be an active endpoint. In accordance with exemplary embodiments of the invention, the LEP configuration registers can maintain such information as, for example: a STALL signal (e.g., set or reset STALL status of an endpoint based on set_stall and clear stall request); a NAK signal (e.g., a negative acknowledgement signal, such that when the bit is 1, all incoming tokens (OUT or IN) are responded to with a NAK handshake); a TYPE signal (e.g., to configure endpoint type, where 00=Isochronous, 01=Interrupt, 10=Bulk, 11=Reserved); a VALID signal (e.g., an indication of whether a given endpoint is valid or not, such that when this bit is 0, it indicates that the endpoint is not available for the USB host); and a Data Toggle signal (e.g., for use with packet synchronization between USB host and device). Other suitable types of configuration and/or status information can be maintained the configuration registers, in accordance with exemplary embodiments of the present invention.

Figure 6:
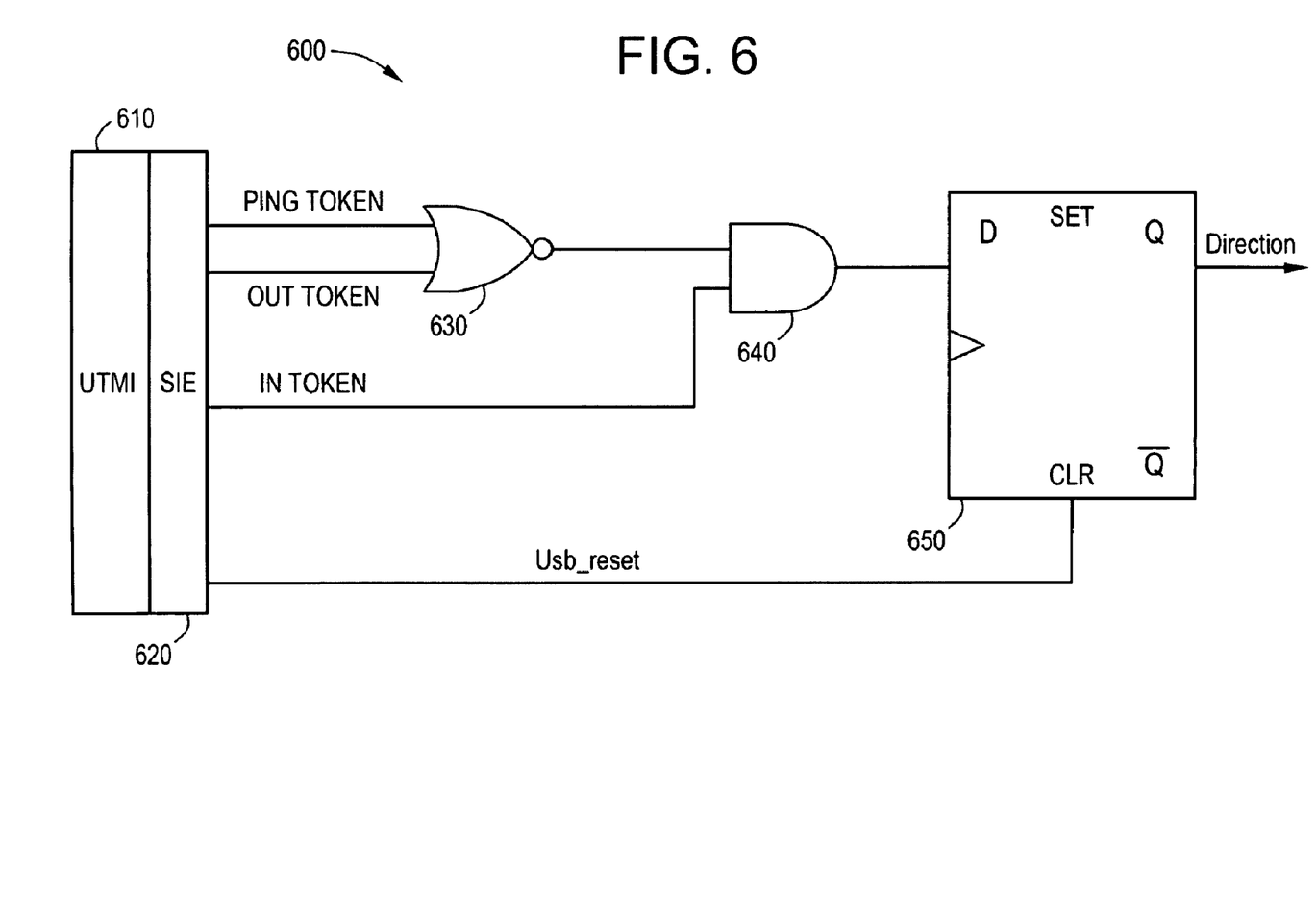
FIG. 6 illustrates an example of a token detection circuit according to an example of the present invention.

Referring to FIG. 6, another exemplary embodiment of the present invention is directed to a token detection circuit 600 (such as that illustrated in FIGS. 2 and 5). The token detection circuit 600 includes a USB 2.0 Transceiver Macrocell Interface (UTMI) circuit 610 coupled to a Serial Interface Engine (SIE) circuit 620. The UTMI circuit 610 provides a standardized interface for USB transceivers that are used in devices. Such a circuit is particularly useful when interfacing between the high-speed (e.g., 480 MHz) USB 2.0 transceiver and the SIE circuit 620 which runs the USB 2.0 protocol for a device, in accordance with an example of the invention. The circuits 610 and 620 depict an example of a USB control circuit macro. A first output terminal of the SIE circuit 620 is coupled to a first input terminal of a NOR gate 630 and a second output terminal of the SIE circuit 620 is coupled to a second input terminal of the NOR gate 630. The first output terminal is configured to send a PING TOKEN or the like to the NOR gate 630, and the second output terminal sends an OUT TOKEN or the like to the NOR gate 630. A third output terminal of the SIE circuit 620 (IN TOKEN) is coupled to a first input terminal of an AND gate 640, and a second input terminal of the AND gate 640 is coupled to the output terminal of the NOR gate 630. A fourth output terminal of the SIE circuit 620 is coupled to a CLR (CLEAR) input of a D-flip flop 650, wherein a USB_RESET signal or the like is fed to the clear input of the D-flip flop 650. An output of the AND gate 640 is coupled to the data input (D) of the D-flip flop 650. An output terminal (Q) of the D-flip flop 650 generates a direction output. As discussed previously, the direction output is used for the new endpoint number generation according to exemplary embodiments of the present invention.

Figure 7:
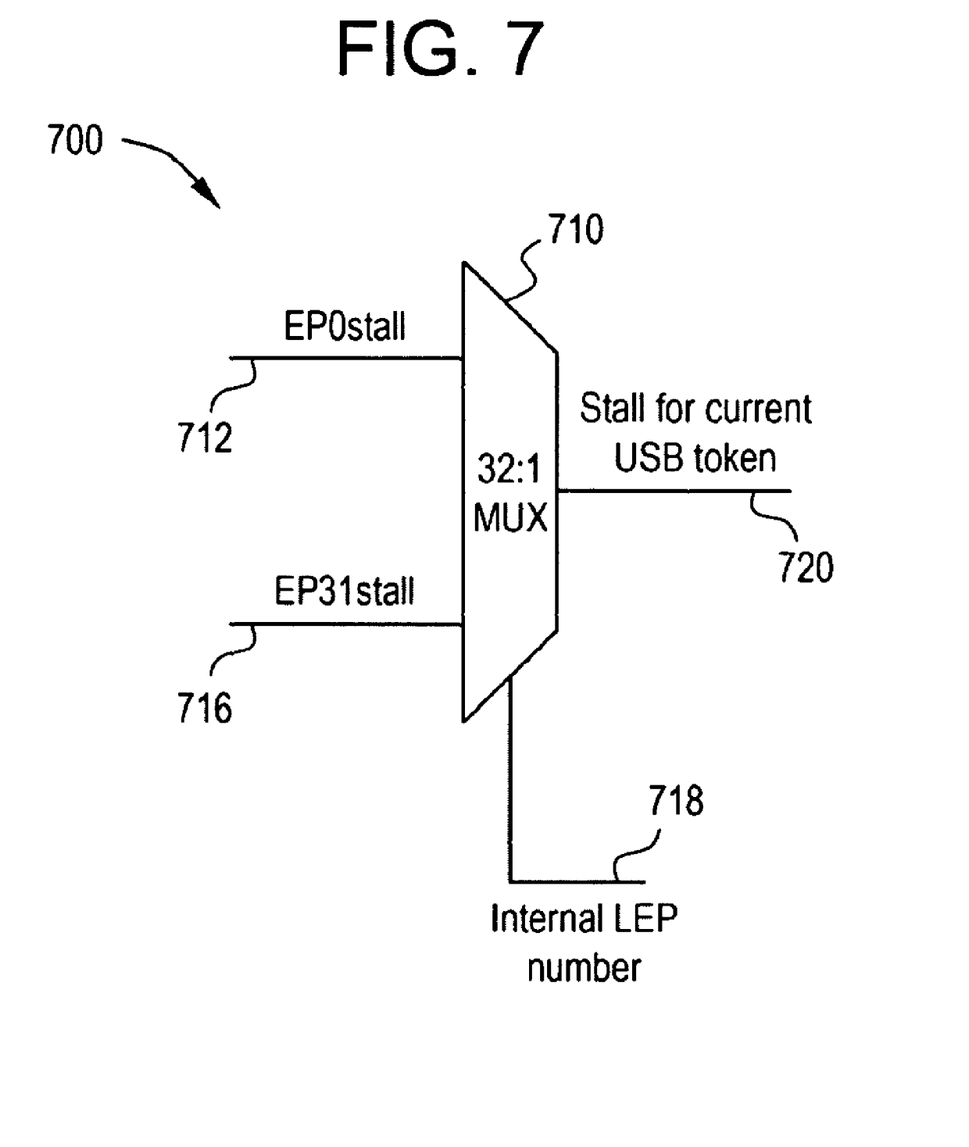
FIG. 7 illustrates an example of a configuration and status control logic circuit in accordance with an embodiment of the present invention.

FIG. 7 illustrates an example of a configuration and status control logic circuit 700 (such as that illustrated in FIGS. 2 and 5). The circuit 700 includes a multiplexer 710 coupled to endpoints (e.g., a 32:1 multiplexer for use with EP0 to EP31, although the multiplexer 710 can be configured to support any suitable number of endpoints). A suitable endpoint stall signal can be supplied to the multiplexer for each endpoint. For purposes of illustration and not limitation, for a 32:1 multiplexer 710, an EP0_stall signal can be coupled at a first input 712 of the multiplexer 710, and an EP31_stall signal can be coupled at a 32nd input 716 of the multiplexer 710, with each of the intervening endpoints having a corresponding EP stall signal coupled to an input of the multiplexer 710. A select input 718 of the multiplexer 710 is configured to provide an internal LEP number, such that a value fed to the select input 718 determines the endpoint number to be stalled (i.e., the output on output terminal 720 of the multiplexer 710). Stall statuses can be stored in different registers, such as, for example, 32 different registers in accordance with the present illustration. Continuing with the present illustration, upon receiving a USB token for, for example, a 4-bit endpoint number, a corresponding internal 5-bit endpoint number determines whether to send a STALL handshake or not. Other bit lengths for the endpoint numbers can be used depending on the needs of the system. Those of ordinary skill in the art will recognize that the numbers and values used in the previous, present and following examples are merely for illustration and not to limit embodiments of the present invention.

Figure 8:
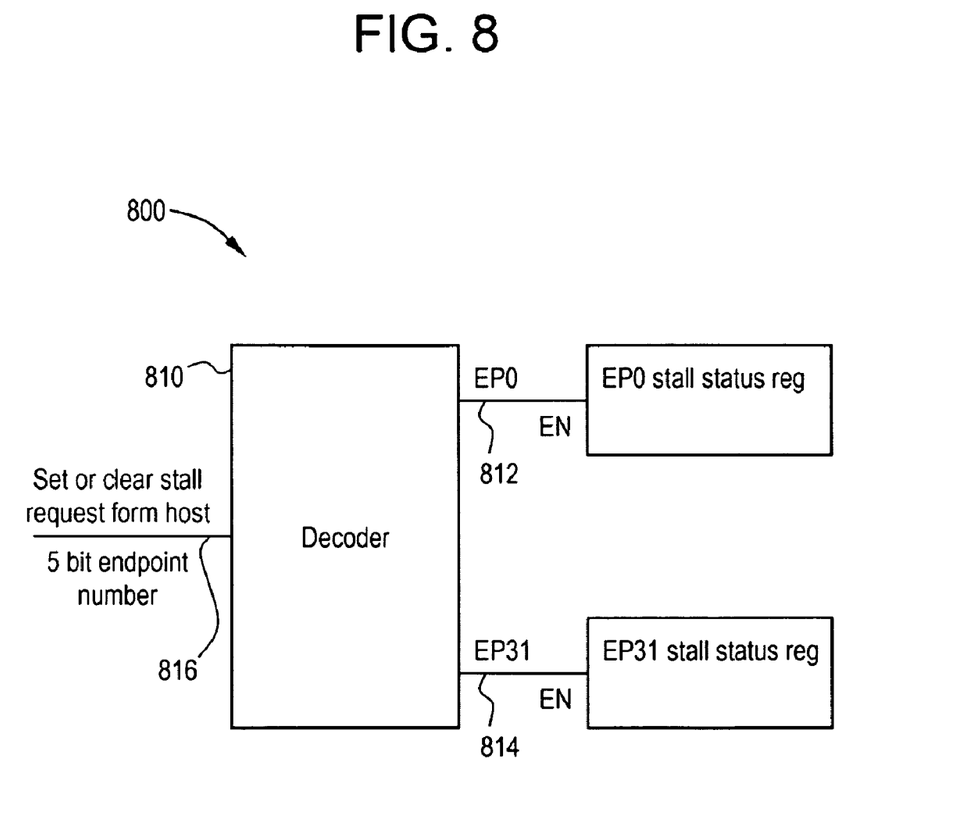
FIG. 8 illustrates an example of decoder logic residing in a configuration and status control logic circuit according to an exemplary embodiment of the present invention.

FIG. 8 illustrates an example of a configuration register 800 with reference to a set stall and clear stall USB host request condition. For purposes of illustration and not limitation, whenever a USB host issues a set stall or clear stall request for, for example, a 5-bit endpoint number, a decoder logic 810 (as residing in the configuration register) generates an enable signal (through output terminals 812 through 814 for endpoints EP0 through EP31, although any suitable number of endpoints can be supported) for corresponding input signal 816 to set or clear the stall bit in appropriate endpoint STALL status register. The decoder logic 810 is configured to decode the internal 5-bit endpoint number to generate the enable signal for the appropriate endpoint STALL status register (although endpoint numbers of any suitable length can be supported by the present invention). Suitable MUX and decoder logic can be used for maintaining data toggle bits.

Figure 9:
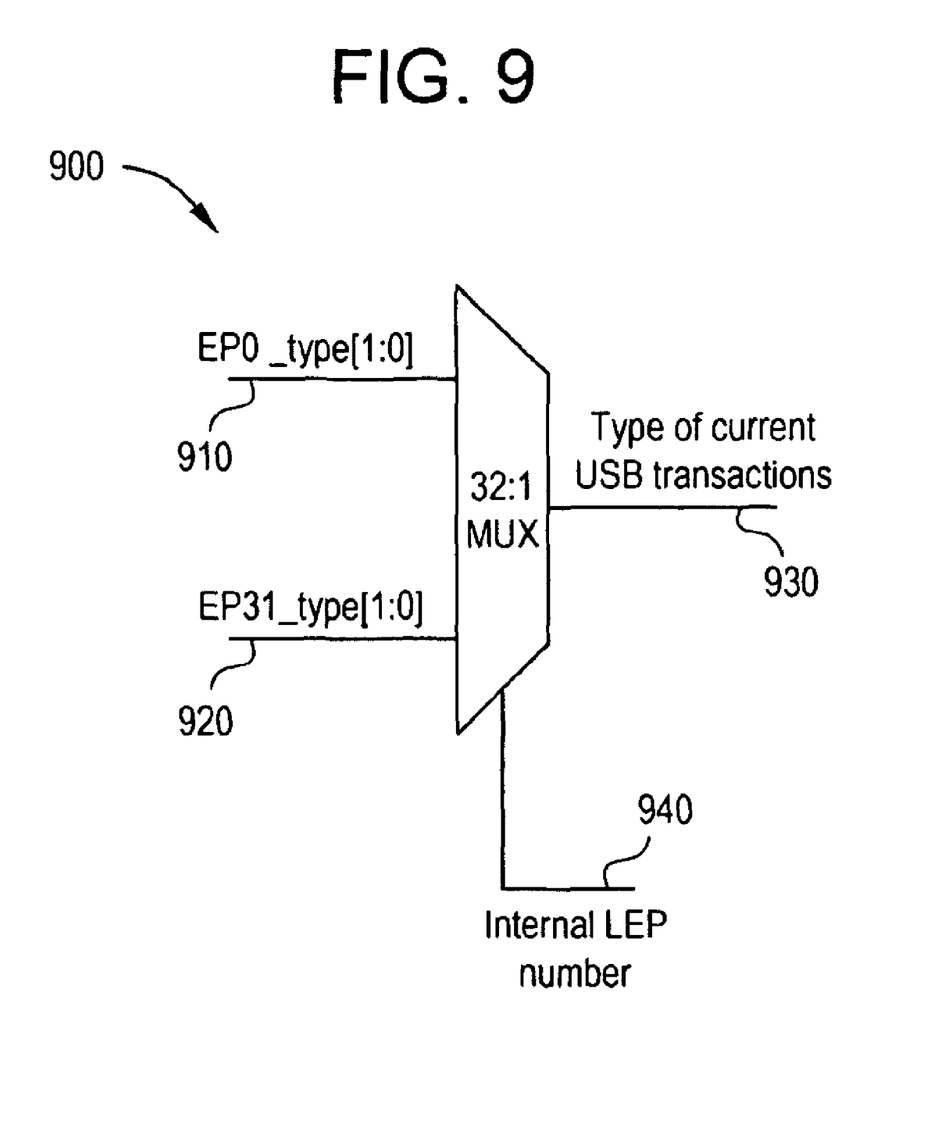
FIG. 9 illustrates an example of a multiplexer circuit residing in a configuration and status control logic circuit in accordance with an exemplary embodiment of the present invention.

For purposes of illustration and not limitation, FIG. 9 illustrates a 32:1 multiplexer circuit 900 (although the multiplexer circuit 900 can be configured to support any suitable number of endpoints). According to an exemplary embodiment of the present invention, the multiplexer circuit 900 can be used to determine the type (e.g., BULK, INTERRUPT, ISOCHRONOUS, or the like) of the currently received USB token (e.g., as part of, for example, the control block 550 of FIG. 5 or as illustrated in FIG. 2). The circuit 900 comprises a first input 910 (e.g., for EP0_type [1:0]) and $n^{th}$ input 920 (e.g., for EP31_type [1:0]). In the present illustration, 32 endpoints are indicated, although exemplary embodiments of the present invention can be configured to support any suitable number of endpoints. In addition, the endpoint type is indicated as 2 bits, although the present invention can be configured to support an endpoint type comprised of any appropriate number of bits. An output terminal 930 of the multiplexer circuit 900 generates a type (e.g., as referred to in the description of FIG. 5) of the current USB transaction. An internal LEP number applied to the select input 940 is used by the multiplexer 900 to determine the value at the output terminal 930.

Figure 10:
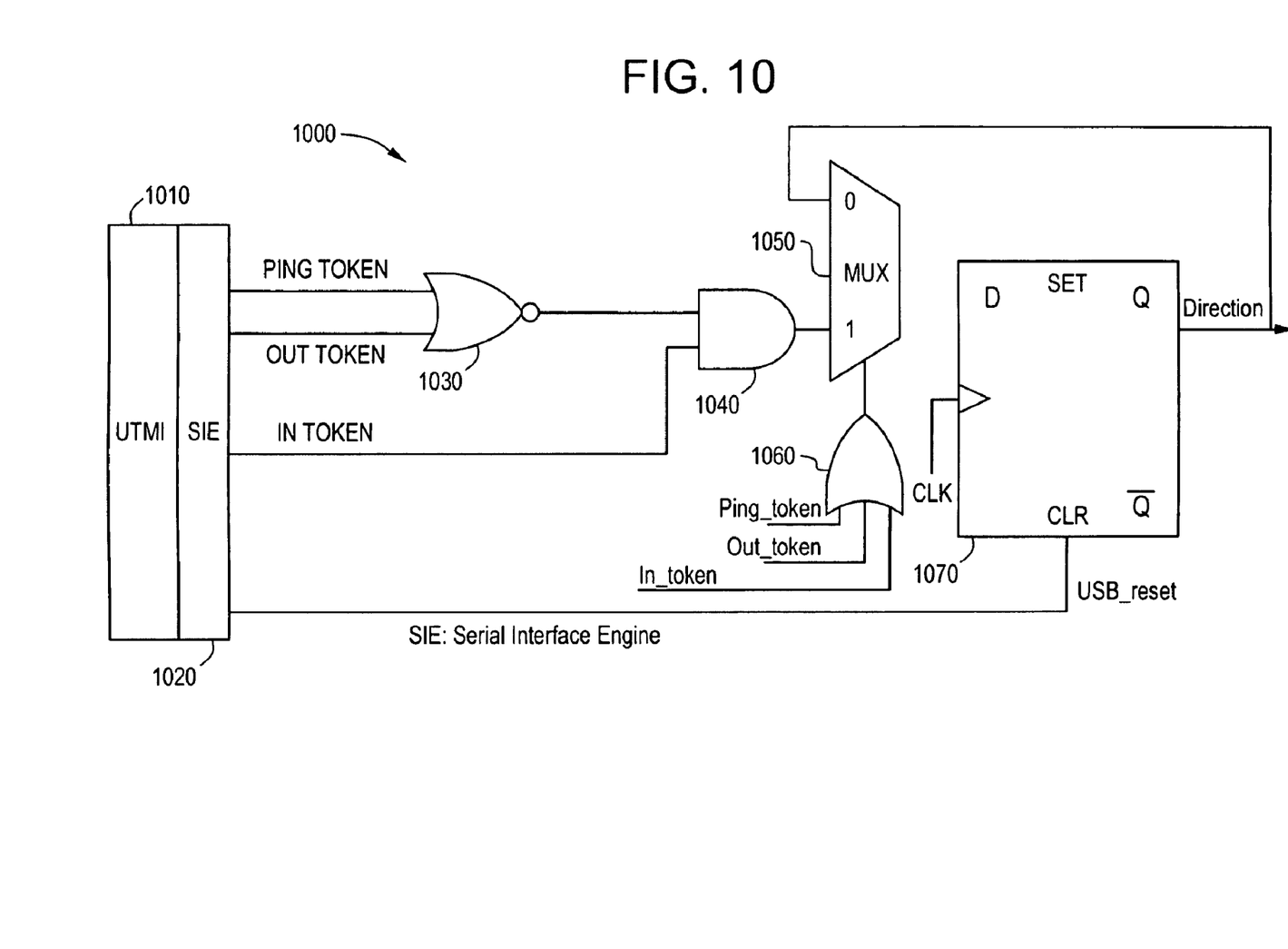
FIG. 10 illustrates a token detection circuit, in accordance with an exemplary embodiment of the present invention.

For purposes of illustration and not limitation, FIG. 10 depicts an exemplary embodiment of a token detection circuit 1000 (such as that illustrated in FIGS. 2 and 5), in accordance with an embodiment of the invention. According to an exemplary embodiment, the token detection circuit 1000 includes a USB 2.0 Transceiver Macrocell Interface (UTMI) circuit 1010 coupled to a Serial Interface Engine (SIE) circuit 1020. The UTMI circuit 1010 provides a standardized interface for USB transceivers that are used in devices. Such a circuit is particularly useful when interfacing between the high-speed (e.g., 480 MHz) USB 2.0 transceiver and the SIE circuit 1020 which runs the USB 2.0 protocol for a device. A first output terminal of the SIE circuit 1020 is coupled to a first input terminal of a NOR gate 1030 and a second output terminal of the SIE circuit 1020 is coupled to a second input terminal of the NOR gate 1030. The first output terminal is configured to send a PING TOKEN or the like to the NOR gate 1030, and the second output terminal is configured to send an OUT TOKEN or the like to the NOR gate 1030. A third output terminal of the SIE circuit 1020 (IN TOKEN) is coupled to a first input terminal of an AND gate 1040, and a second input terminal of the AND gate 1040 is coupled to the output terminal of the NOR gate 1030. The output terminal of the AND gate 1040 is coupled to a first input terminal (e.g., logic 1 input terminal) of a multiplexer 1050. A select terminal of the multiplexer 1050 is coupled to an output terminal of an OR gate 1060, wherein the OR gate 1060 is coupled at a first input terminal to a signal Ping_token, at a second input terminal to a signal Out_token, and at a third input terminal to a signal In_token. For the purpose of clarity, the three signals (Ping_token, Out_token and In_token) at the input terminals of the OR gate 1060 correspond to the signals PING TOKEN, OUT TOKEN and IN TOKEN, respectively. An output terminal of the multiplexer 1050 is coupled to a data input (e.g., D) of D-flip flop 1070, and a second input terminal (e.g., logic 0 input terminal) of the multiplexer 1050 is coupled to an output terminal (e.g., Q) of the D-flip flop 1070, wherein the output terminal Q generates a Direction output of the token detection circuit 1000. A clear input (e.g., CLR) of the flip flop 1070 is coupled to a fourth output terminal of the SIE circuit 1020, and a clock signal is coupled to the control input of the D-flip flop 1070 (e.g., CLK).

Figure 11:
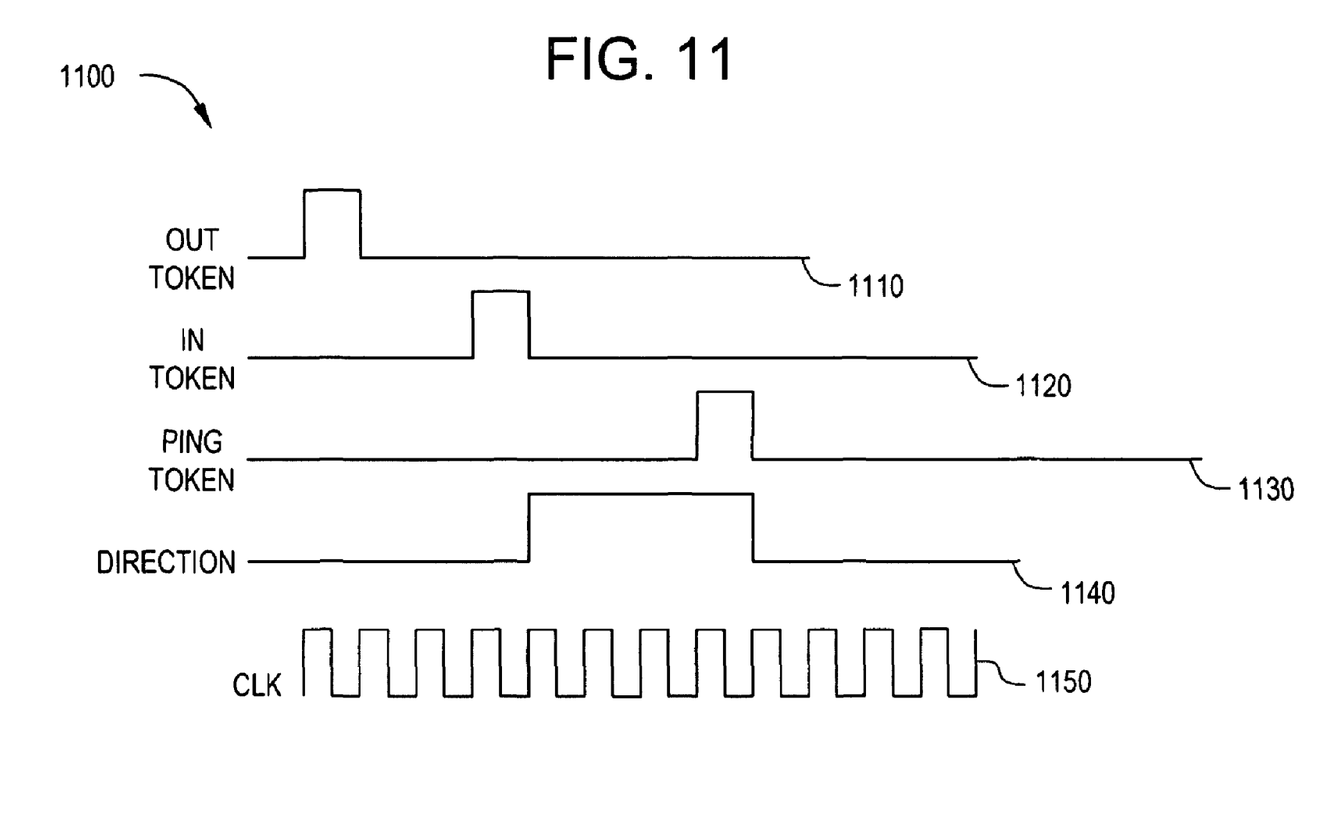
FIG. 11 illustrates waveforms corresponding to the token detection circuit illustrated in FIG. 10, in accordance with an exemplary embodiment of the present invention.

FIG. 11 illustrates exemplary waveforms 1100 generated by and for use with the token detection circuit 1000 illustrated in FIG. 10. The OUT TOKEN signal 1110 comprises a logic 1 (or logic high) state at a first time. The IN TOKEN signal 1120 comprises a logic 1 (or logic high) state at a second time, which is non-overlapping with the logic 1 state of the OUT TOKEN signal 1110. The PING TOKEN signal 1130 comprises a logic 1 (or logic high) state at a third time, which is non-overlapping with the logic 1 state of the OUT TOKEN signal 1110 and logic 1 state of the IN TOKEN signal 1120. The DIRECTION signal 1140 comprises, for example, the output of the D-flip flop 1070 illustrated in FIG. 10. Signal 1150 comprises a clock (e.g., CLK) signal, which is a control input to the D-flip flop 1070. For purposes of illustration and not limitation, as the IN TOKEN signal 1120 transitions from logic 1 to logic 0 (or from logic high to logic low), the DIRECTION signal 1140 changes its level from logic 0 to logic 1 (or from logic low to logic high), thereby indicating a first (e.g., IN) direction. As the PING TOKEN signal 1130 transitions from logic 1 to logic 0, the DIRECTION signal 1140 changes its level from logic 1 to logic 0, thereby indicating a second (e.g., OUT) direction. Thus, according to exemplary embodiments of the present invention, the token direction circuit 1000 can determine the direction of the USB data transfer (e.g., IN or OUT) in accordance with, for example, the USB token type. The new LEP address can then be formed through the appropriate combination of the original LEP address and the determined direction.

Exemplary embodiments of the present invention can be used in conjunction with any suitable type of integrated circuit or a bus or a port, such as a USB circuit (e.g., compliant with USB 1.0 or 2.0), to generate a new endpoint address by combining the endpoint number and its direction, thereby optimizing the use of physical endpoint buffers without increasing physical memory.

Embodiments of the present invention are well suited to performing various other steps or variations of the steps recited herein, and in a sequence other than that depicted and/or described herein. In one embodiment, such a process can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Each of elements of the circuits 200, 300, and 500-900 can be comprised of any suitable type of electrical or electronic circuit, component or device that is capable of performing the functions associated with the respective element. Any or all of the elements of circuits 200, 300, and 500-900 can be connected to one another using any suitable type of electrical connection capable of communicating electrical information. Alternatively or additionally, any or all elements of the circuits 200, 300, and 500-900 can be formed on, for example, a monolithic substrate. Details of the improved circuit providing an increase in the number of endpoints in a target USB device without increasing the physical memory, and the method of achieving the same, that are widely known and not relevant to the present discussion have been omitted from the present description for purposes of clarity and brevity.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A Universal Serial Bus (USB) control circuit, comprising:
   a token detection circuit,
      wherein the USB control circuit is configured to receive a first logical endpoint (LEP) address and a USB token, and
      wherein the token detection circuit is configured to determine a direction of a USB data transfer in accordance with a USB token type;
   an endpoint configuration and status control logic circuit in communication with the token detection circuit,
      wherein the endpoint configuration and status control logic circuit is configured to control configuration and status information associated with each of a plurality of LEP input buffers and LEP output buffers, and
      wherein the USB control circuit is configured to generate a second LEP address in accordance with a combination of the first LEP address and the determined direction to increase a quantity of LEPs without increasing the quantity of physical endpoint (PEP) buffers of a USB device; and
   a LEP-to-PEP mapping circuit in communication with the USB control circuit,
      wherein the LEP-to-PEP mapping circuit is configured to determine to which PEP buffer to send the LEP data.

2. The USB control circuit of claim 1, wherein the endpoint configuration and status control logic is configured to provide the second LEP address to the LEP-to-PEP mapping circuit.

3. The USB control circuit of claim 1, wherein the LEP-to-PEP mapping circuit is in communication with a controller circuit, the plurality of LEP input buffers and LEP output buffers, and a plurality of PEP buffers.

4. The USB control circuit of claim 3, comprising:
   an endpoint service logic circuit in communication with the controller circuit and the plurality of PEP buffers.

5. The USB control circuit of claim 4, wherein the controller is configured to communication the second LEP address from a queue in a first-in-first-out (FIFO) manner to the endpoint service logic circuit,
   wherein the endpoint service logic circuit is configured to receive input signals from the plurality of PEP buffers, and
   wherein the endpoint service logic circuit is configured to communicate endpoint data in the FIFO manner to an external processor.

6. The USB control circuit of claim 1, wherein the USB token comprises a sync field, a packet identifier, a device address field, an endpoint field, a cyclic redundancy check and an end of packet.

7. The USB control circuit of claim 1, wherein the endpoint configuration and status control logic comprises a plurality of configuration registers, and
wherein the plurality of configuration registers are configured to control the configuration and status information associated with each of the plurality of LEP input buffers and LEP output buffers.

8. The USB control circuit of claim 1, wherein the status information comprises at least one of data toggle status and LEP stall status.

9. The USB control circuit of claim 1, wherein the endpoint configuration and status control logic circuit is configured to determine a USB device handshake response for USB tokens of a LEP, and
wherein a handshake packet is configured to indicate whether at least one of LEP data and the USB token were received successfully.

10. The USB control circuit of claim 1, wherein the first LEP address comprises an endpoint field having n bits, and the second LEP address comprises an endpoint field have n+1 bits.

11. A system for increasing Universal Serial Bus (USB) device endpoints, comprising a host device in communication with digital control logic,
wherein the digital control logic is configured to support a plurality of device applications without increasing physical memory of the host device,
wherein the digital control logic is configured to generate a second logical endpoint (LEP) address by combining a first LEP address and a direction indication associated with a host device token, and
wherein the digital control logic is in communication with a LEP-to-physical endpoint (PEP) mapping circuit, the LEP-to-PEP mapping circuit configured to determine which PEP buffer to send LEP data.

12. The system of claim 11, wherein the first LEP address comprises n bits, and the second LEP address comprises n+1 bits.

13. A method of increasing Universal Serial Bus (USB) device endpoints in a USB system, comprising:
receiving a first logical endpoint (LEP) address and a USB token; and
determining direction of data transfer in accordance with a USB token type;
generating a second LEP address by combining the first LEP address and determined direction;
mapping the second LEP address to a physical endpoint (PEP); and
communicating LEP data to one of a plurality of PEP buffers in accordance with the mapping.

14. The method of claim 13, comprising:
storing the second LEP address in a first in first out (FIFO) queue corresponding to the plurality of PEP buffers.

15. The method of claim 14, comprising:
communicating the second LEP address from a top of the FIFO queue when an acknowledgement is received form a USB host for OUT tokens or from a USB processor for IN tokens; and
outputting the LEP data to the USB processor in a FIFO manner.

16. The method of claim 13, wherein the second LEP address comprises more bits than the first LEP address.

17. A method for determining a unique Universal Serial Bus (USB) endpoint in a USB system, comprising:
determining a direction of LEP data flow;
generating a second logic endpoint (LEP) address by combining a first logical endpoint address and the determined direction;
mapping the second LEP address to a physical endpoint (PEP); and
storing the second LEP address in a FIFO queue corresponding to PEP buffers, wherein the second LEP address stored at a top of the FIFO queue is popped when an acknowledgement is received from a USB host for incoming tokens or from a USB process for outgoing tokens.

18. The method of claim 17, wherein for an outgoing token, LEP data is pushed into an OUT PEP buffer n accordance with space availability, for an incoming token, LEP data is popped from an IN PEP buffer in accordance with data availability, and the first logical endpoint address comprises n bits, and the second LEP address comprises n+1 bits.

* * * * *